Oct. 27, 1931.   G. BACK   1,829,179

METHOD OF MAKING TURBINE BLADES

Filed Jan. 11, 1929

WITNESS
E. Lutz

INVENTOR
G. Back.
BY
A. B. Reavis
ATTORNEY

Patented Oct. 27, 1931

1,829,179

UNITED STATES PATENT OFFICE

GOLDIE BACK, OF PHILADELPHIA, PENNSYLVANIA, ASSIGNOR TO WESTINGHOUSE ELECTRIC & MANUFACTURING COMPANY, A CORPORATION OF PENNSYLVANIA

METHOD OF MAKING TURBINE BLADES

Application filed January 11, 1929. Serial No. 331,896.

My invention relates to elastic fluid turbines, and more particularly to the blading thereof, and it has for an object to improve the efficiency of apparatus of this character, and to provide a construction having less stress, other factors being equal, than has heretofore been provided.

Turbine blades are subjected to various bending and centrifugal stresses, which, if the blades are of a solid construction, result in imposing high stresses upon the rotor and often require a heavier rotor construction than would otherwise be necessary. In many cases the solid blades themselves may be subjected to serious stresses which limit the centrifugal loads that may be imposed upon them. It is known that stresses may be reduced by constructing the blade in a tapered form. The extent to which this tapering can be carried out is limited in degree because the tip of the blade cannot be reduced below the desired total cross section at the tip. Furthermore, the thickening of the blade section at the base is sometimes objectionable because of its interference with the desired form of the blade passage.

Hollow blade constructions are not new and are a means of reducing the stresses in the blade carrying element as compared with solid blades. It is further not new to construct hollow blades divided longitudinally with each element thickened at the base, by means of which some reduction of stress in the blade itself may be produced. It is, however, new to construct each longitudinal element of a hollow blade with the root portion formed integrally therewith, and by said construction greater strength of attachment to the blade carrying element is secured than has heretofore been possible with blades of hollow construction.

A further object of this invention, therefore, is to provide a simple and accurate method of manufacturing a hollow turbine blade. It is a further object, to provide for reducing the cost of manufacture and improving and simplifying the design of a hollow blade so that it may be made in longitudinal sections which may be accurately formed to their proper proportions by relatively simple machining or forging operations, or by both, and then joined together in such manner that little stress will be imposed upon the weld, or other joining means, during operation of the turbine.

A difficulty in the operation of turbine blading is sometimes experienced due to corrosion or erosion, or both, of the inlet edge of the blade. A further application of my invention, therefore, permits the use of some material, more resistant to corrosion or erosion than the material of the blade itself, in the welding operations at the inlet and outlet edges of the blade, to reduce destructive effects of the corrosion or erosion to which the blade is exposed.

These and other objects are effected by my invention, as will be apparent from the following description and claims taken in connection with the accompaying drawings, forming a part of this application, in which:

Figure 1:
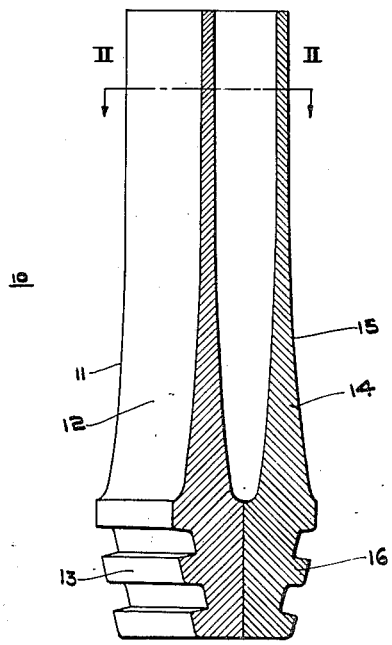
Fig. 1 is a sectional elevation of a turbine blade.

According to my invention, a turbine blade is made in halves, one half including the convex working surface and the root portion, and the other half including the concave working surface and its root portion. These halves are finished to their proper form and are then joined together, by welding, brazing, fusion or other means. In this way, it is possible to make a hollow turbine blade, the external portion of which may be accurately formed as desired and suitable for the steam passage but with the interior walls of sectional area, which is accurately proportioned to the proper tapered form and of varying cross section to give the maximum strength with the least weight.

In the drawings, I show a turbine blade indicated generally at 10 and comprising the portion 11, which includes the conclave working surface 12 with its root portion 13, and another portion 14, which includes the convex working surface 15 with its root portion 16. By constructing the blade in two halves in this manner, and in each instance making the root portion integral with its corresponding half of the blade, a strong and rigid construction is secured. These portions 11 and 14, respectively, may be readily made to accurate proportions by some simple operation, as for example, by drop forging, or by suitable machining operations, and after the sections have been properly formed, they may be joined together along their longitudinal edges as indicated at 17 and 18 in Fig. 2. The juxtaposed portions of the roots may be similarly joined. It may then be desirable to machine the exterior surface of the blade, or to machine the joined edge portions to the proper thickness.

I may accomplish the welding by a brazing process or by copper fusion in a hydrogen atmosphere, both well known to those skilled in the art. An alternative method is to employ electric arc welding, welding by means of acetylene or hydrogen gas or their equivalents. In this case I will form the juxtaposed edges of the blades as shown at "X" in Fig. 3 where I may employ an acetylene or electric arc welding.

I may employ for the welded material a corrosive or erosive resisting material such as certain resisting steels, pure nickel, certain silver alloys, etc.

Subsequent to welding I may grind or otherwise sharpen the inlet and outlet edges as desired.

Figures 2, 3:
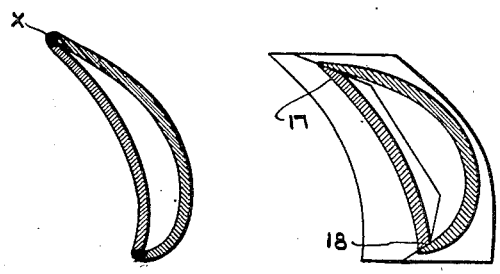
Fig. 2 is a section on the line II—II of Fig. 1.
Fig. 3 is a section similar to Fig. 2, but showing an alternative method of welding.

It will readily be seen therefore, that I have provided a simple and inexpensive method for making a hollow turbine blade of variable cross-section and that this blade, being joined along the longitudinal edges of its respective portions, as indicated at 17 and 18 in Fig. 2, is relatively strong and that the welds, which hold these sections together do not carry any appreciable amount of stress. While the sections of this blade may conveniently be made as drop forging, it will also be apparent that these sections could be machined from bars or forgings of varying thickness properly designed to give suitable strength through the blade length and the proper thickness in the root.

Preferably the root portions 13 and 16 extend in the same general directions, as the front and back portions 11 and 15, respectively, of the blades, that is, the root portion of the front part of the blade has a convex face contacting with a concave face on the root portion of the blade back. This facilitates manufacture, as the deformation of stock in manufacture is kept at a minimum.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. The method of making a turbine blade which comprises forming the respective concave and convex portions of the blade from separate blanks and as complementary elements which are adapted to fit together, making those portions of the root of each of the respective concave and convex portions as integral parts of each of the respective concave and convex portions, making the root portions so formed with contact faces complementary to each other so that they may fit together, and joining the respective concave and convex portions together along their longitudinal edges by fusion of metal.

2. The method of making a turbine blade which consists in separately forming face and back portions of the blade with root portions, the root portions extending generally in the same transverse direction as the front and back portions and having convex and concave contact faces, and in joining the lateral edges of the front and back portions.

3. A hollow turbine blade consisting of laterally joined front and back parts having integral root portions which extend in the same general transverse direction as the front and back parts and which have convex and concave contact faces, respectively.

4. A hollow turbine blade consisting of front and back parts having integral root portions which extend in the same general transverse direction as the front and back parts and which have complementary contact faces, each of said front and back parts and its integral root portion being part of a single forging, the lateral edges of the front and back parts being joined by fusion of metal.

In testimony whereof, I have hereunto subscribed my name this 7th day of January, 1929.

GOLDIE BACK.